(12) United States Patent
Menne

(10) Patent No.: US 7,694,789 B2
(45) Date of Patent: Apr. 13, 2010

(54) STARTING UNIT

(75) Inventor: Achim Menne, Crailsheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 298 days.

(21) Appl. No.: 10/595,663

(22) PCT Filed: Nov. 10, 2004

(86) PCT No.: PCT/EP2004/012698

§ 371 (c)(1),
(2), (4) Date: May 3, 2006

(87) PCT Pub. No.: WO2005/050048

PCT Pub. Date: Jun. 2, 2005

(65) Prior Publication Data

US 2008/0000743 A1    Jan. 3, 2008

(30) Foreign Application Priority Data

Nov. 14, 2003    (DE) ................................ 103 53 519

(51) Int. Cl.
*F16D 33/04* (2006.01)
*F16D 33/06* (2006.01)
*F16D 33/16* (2006.01)
*F16H 45/02* (2006.01)

(52) U.S. Cl. ....................................... 192/3.29; 192/57
(58) Field of Classification Search ................ 60/334, 60/342, 353, 356; 192/57
See application file for complete search history.

(56) References Cited

U.S. PATENT DOCUMENTS

| 2,116,461 | A | * | 5/1938 | Fottinger | ...................... 60/353 |
| 2,731,119 | A | | 1/1956 | Burdett et al. | |
| 3,952,508 | A | | 4/1976 | Bopp | |
| 4,128,999 | A | * | 12/1978 | Yokoyama et al. | ........... 192/3.3 |
| 6,394,243 | B1 | | 5/2002 | Sasse | |
| 2003/0168298 | A1 | * | 9/2003 | Holler et al. | ................ 192/3.29 |

FOREIGN PATENT DOCUMENTS

| DE | 199 17 893 | 10/2000 |
| WO | 00/55519 | 9/2000 |

* cited by examiner

*Primary Examiner*—Rodney H Bonck
(74) *Attorney, Agent, or Firm*—Baker & Daniels LLP

(57) ABSTRACT

The invention relates to a starting unit comprising: an input, which can be coupled to a drive, and an output that can be coupled to a driven part; a starting element provided in the form of a hydrodynamic component, comprising at least one primary turbine wheel and one secondary turbine wheel that, together, form a working chamber which can be filled with operating material; an engaging and disengaging clutch comprising at least two clutch elements that can be brought into frictionally engaged active contact with one another in a direct or indirect manner via additional intermediate elements, the first clutch element being at least indirectly connected to the input in a rotationally fixed manner and the second clutch element being at least indirectly connected to the output in a rotational fixed manner; an adjusting device assigned thereto, and; a stationary or rotating housing that surrounds at least one of the turbine wheels while forming an adjoining chamber. The adjusting device of the engaging and disengaging clutch is situated in the adjacent chamber while forming a first operating material supply channel or space and can be subjected to the action of pressure prevailing therein. The operating material supply channel or space can be connected at least indirectly to an operating means supply source. The invention is characterized by the following features: means for influencing the transmission behavior of the hydrodynamic component, comprising at least one mechanical built-in part that acts at least indirectly upon the working circuit ensuing inside the working chamber; an adjusting device assigned to the mechanical built-in part, and means for subjecting the adjusting device to a differential pressure, which results from the pressure in the first operating means supply channel or space or in a channel or space coupled thereto or in the interior of the housing, and to a control pressure.

23 Claims, 4 Drawing Sheets

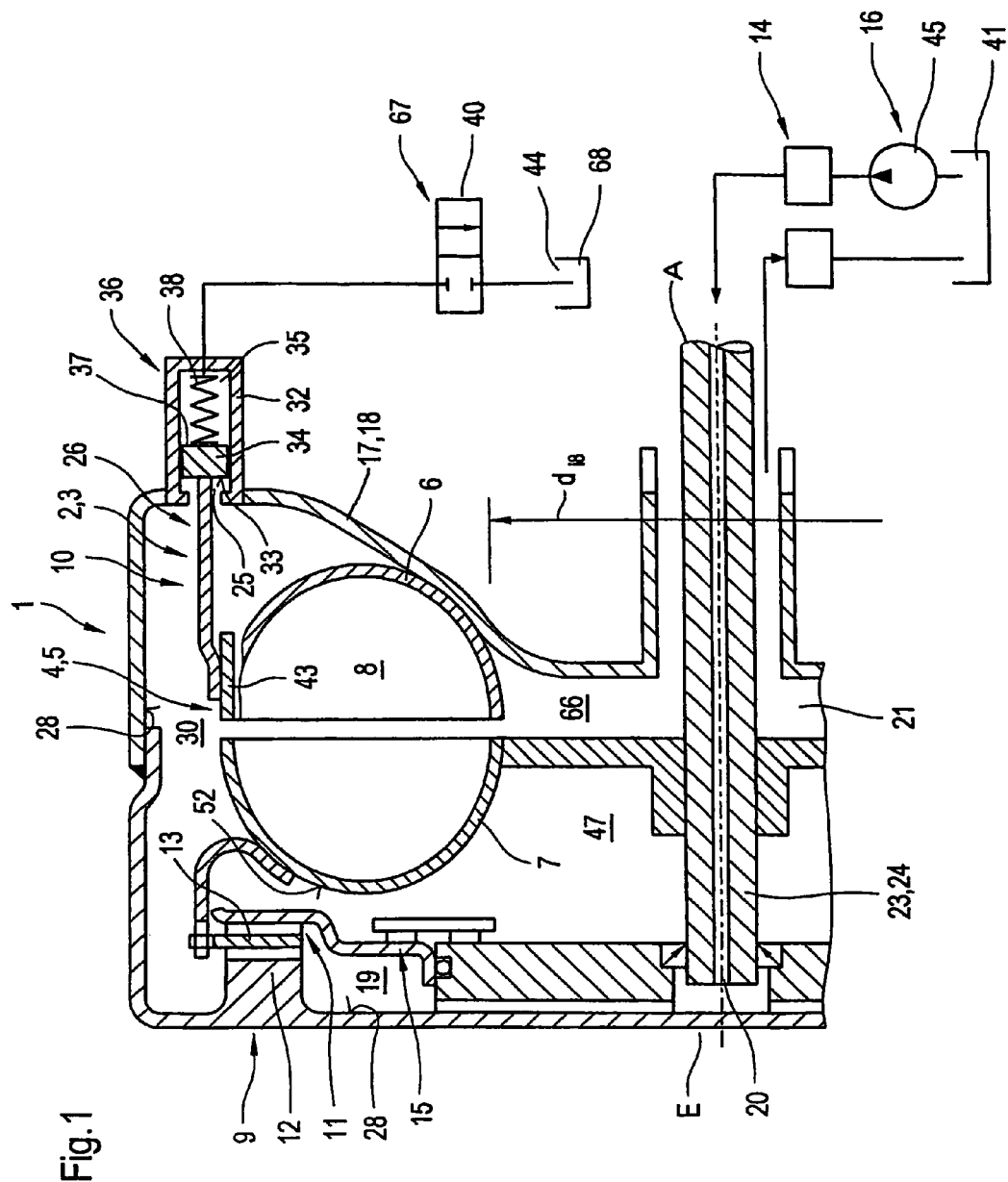

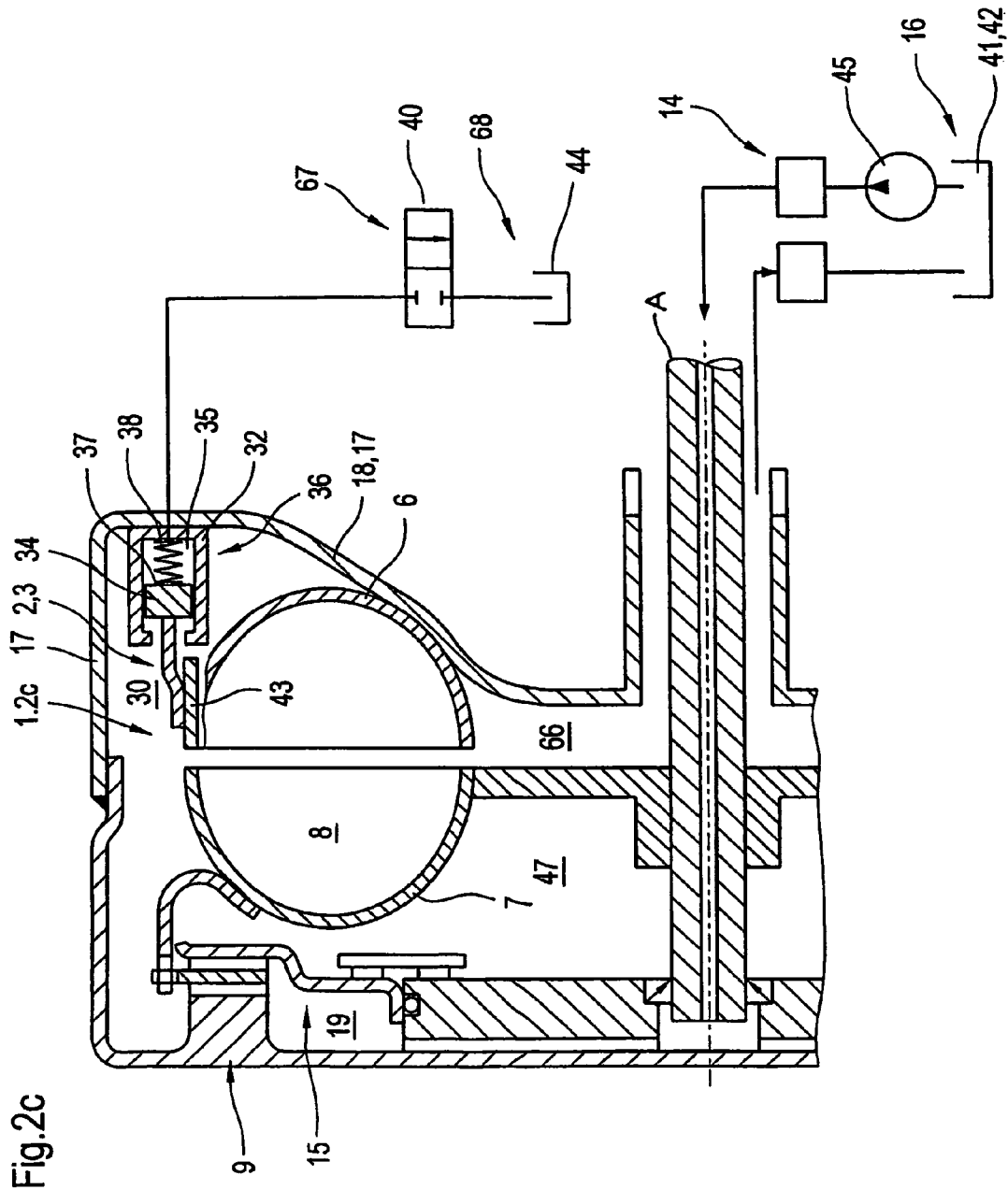

STARTING UNIT

The invention relates to a hydrodynamic starting unit.

Starting units, comprising a hydrodynamic clutch, in particular a controllable or adjustable hydrodynamic clutch, are known in a great number of embodiments from the state of the art. The starting unit comprises an input that can be coupled to a drive and an outlet that can be coupled to a driven unit. The hydrodynamic coupling, comprising a primary turbine or blade wheel and a secondary turbine or blade wheel, which together form a toroid-shaped working chamber, is arranged between the input and the output. The hydrodynamic clutch is free from a stator. The primary turbine wheel is connected to an impeller pan in a rotationally fixed manner. Said impeller pan surrounds the secondary turbine wheel in the axial direction and completely in the peripheral direction. The starting unit further comprises an engaging and disengaging clutch acting as a lockup clutch, which is in parallel arrangement to the hydrodynamic clutch and which can be engaged and disengaged jointly with the hydrodynamic clutch or by itself. This means that two power branches can be realized via both clutches, whereby the power flow takes place either alone via one of the clutches or jointly via both clutches. The engaging and disengaging clutch comprises at least one clutch input element and one clutch output element, whereby the clutch output element is at least indirectly connected to the secondary turbine wheel in a rotationally fixed manner. The clutch input element is at least indirectly connected to the impeller or to the input E of the starting unit in a rotationally fixed manner. The active contact is realized either directly between the two clutch elements or indirectly via further intermediate elements. Preferably the lockup clutch is designed as a multi-disk clutch, whereby means for generating a frictional contact between the clutch elements constructed as disks are provided. The adjusting device comprises a piston element which can be subjected to pressure media. The piston element can be assigned separately to the individual clutch disks or in the case of an especially compact embodiment is formed by the secondary turbine wheel or is situated directly at said secondary turbine wheel. An operating means supply system is further assigned to the hydrodynamic clutch. The centrifugal or centripetal flow of the clutch is realized via said operating means supply system. In the case of centripetal flow the operating means is guided via an operating material supply channel or space and is fed into the toroid-shaped working chamber in radial direction in the region of the exterior diameter of said toroid-shaped working chamber. In the process the force applied by the operating means upon the adjusting device or the individual clutch elements is used to keep the engaging and disengaging clutch in declutched state or at least to operate it with only a specified amount of slip. The discharge from the toroid-shaped working chamber occurs in the region of the radial inner diameter of the working chamber in a space situated below it or coupled to it, which is also termed a second operating means supply channel and/or operating means supply space. Both the first operating means supply channel and/or space by the inside circumference of the case and the outside circumference of the secondary turbine wheel and the second operating means supply channel and/or space can be exchanged with regard to their function. This is necessary in particular when shifting from the centripetal flow to the centrifugal flow. In the latter case the supply of the operating means to the hydrodynamic clutch takes place via the second operating means supply channel and/or space in the region of the radial inner diameter of the toroid-shaped working chamber, whereby the discharge is performed in the region of the radial outer diameter of the toroid-shaped working chamber at one of the turbine wheels. The engaging and disengaging clutch is then activated. In the case of such starting units the power quantities can consequently be achieved and above all varied via the individual clutches—engaging and disengaging clutch or hydrodynamic clutch. In the process it is desirable in particular in the operation of the hydrodynamic clutch to keep the moment of resistance by the hydrodynamic clutch in the range of very high slip, which corresponds to the moment of resistance by the primary turbine wheel, as low as possible, in order to avoid a negative reaction in particular compression of the speed of the driving engine. This can be realized by the setting of a minimum volumetric efficiency, whereby it has been shown that this measure frequently is not sufficient by itself, since in particular in the range of very high clutch slip, i.e. between 70 and 100 percent there are too high of moments of resistance by the clutch, as a result of which there can be an undesirable reaction on the speed of the driving engine coupled to the hydrodynamic clutch, so that the desired driving dynamics are no longer given.

The invention is thus based on the object of improving a hydrodynamic clutch for use in starting units of the initially named type in such a way that with low constructive and automotive control engineering expenditure a minimization of the idling moment, i.e. of the moment of resistance through the hydrodynamic clutch in the case of maximum slip is achieved.

In accordance with the invention in the case of starting units with an input which can be coupled to a drive and an output which can be coupled to a driven part with a starting element arranged in between in the form of a hydrodynamic component which has an engaging and disengaging clutch assigned to it for bypassing, means are provided for influencing the transmission behavior of the hydrodynamic component which are designed in the form of mechanical built-in parts which can be activated by pressure media, which act at least upon the working circuit ensuing in the working chamber between the primary turbine wheel and the secondary turbine wheel. The mechanical built-in parts which can be activated by pressure media serve the purpose of realizing disturbance ranges which are formed by elements protruding into the working chamber or by sliding parts carrying the circuit. The built-in parts which can be activated by pressure media are coupled with an adjusting device for this purpose. The adjusting device is subjected to a differential pressure from a first pressure and a control pressure. In the process, depending on the location of the adjusting device this first pressure is formed by pressure of the housing interior, the pressure in a first operating means supply channel or space, a space coupled thereto or the pressure in the operating means supply channel or by a differential pressure from one of the afore-mentioned pressures and the pressure of the housing interior in a non-sealed adjusting device, in particular cylinders to the housing in the region of the adjusting device. The control pressure is formed by a pressure already existing or provided in the environment of the starting unit, for example the transmission pressure or the inflation pressure of the clutch etc. Depending on the volume this causes a relief of the adjusting device for example in the transmission or a genuine impinging, as for example in the latter example. The first operating means supply channel or space is formed either entirely or by a partial region of at least one adjoining chamber, which in turn is formed by the surrounding of at least one turbine wheel by a stationary or rotating housing. For this purpose the adjusting device of the engaging and disengaging clutch is situated in the adjoining chamber. This adjusting device and the inside circumference of the housing bound the first operating means supply channel or space.

The flow of the starting unit, in particular of the hydrodynamic clutch occurs at least centripetally, i.e. around the clutch in the intermediate chamber in the region of the junction between the turbine wheels in the radial exterior region of the working chamber. In the process, in this state the engaging and disengaging clutch is flowed through or its adjusting device is at least directly, that is in a direct or indirect manner impinged due to pressure ratios that are built up on the clutch elements that can be brought into active contact with each other depending on the direction of flow. In accordance with the invention these pressure ratios, in particular the pressure in this space or a channel or space coupled thereto are used to subject the adjusting device of the mechanical built-in parts to pressure under the influence of an additional pressure, the control pressure. The setting of a differential pressure occurs in such a way that said differential pressure is suitable for moving the mechanical built-in parts to a position across from the working chamber during the start-up of the hydrodynamic coupling, i.e. very high slip and at increasing speed, which brings about a particularly strong influencing of the flow in the working chamber, while this influence is counteracted during decreasing slip.

With the inventive solution it becomes possible to subject the adjusting devices of the mechanical built-in parts to pressure using already existing lines and channels and the pressures building up and propagating therein, whereby preferably an impinging of the mechanical built-in parts only takes place when the hydrodynamic clutch is activated, i.e. in the case of centripetal flow in the state of at the least partially deactivated engaging and disengaging clutch. In the state of centrifugal flow as a rule no impingement takes place. In particular, in this case with the presence of a control pressure the circuit ensuing in the toroid-shaped working chamber would not be disturbed, since in this state the built-in parts which can be activated by pressure media would remain in their neutral setting, i.e. in the state, which is characterized by the non-influence of the working circuit. The impingement occurs with the pressure becoming active on the adjusting device from the differential pressure, which is present in the first operating means supply channel or space or a channel or space that can be coupled thereto at least indirectly or in the interior of the housing and from the control pressure, which is preferably formed by a pressure source that is already present in the environment of the starting unit. For example, the inflation pressure or the transmission pressure can be used as the control pressure. In advantageous manner with this a particularly sensitive setting of the position of the mechanical built-in parts which can be activated by pressure media can occur regardless of the actual pressure present in the operating means supply channel and/or space or a space coupled thereto which cannot be influenced.

The engaging and disengaging clutch is at least partially deactivated in the case of centripetal flow, i.e. either completely deactivated or is operated with great slip. The first operating means supply channel or space is formed in the process by at least one sub-region of the adjacent chamber, in particular by the space between the housing and the adjusting device of the engaging and disengaging clutch. In the process the first operating means supply channel or space can correspond either entirely to the adjacent chamber or partially. In the former case the secondary turbine wheel acts as the adjusting device of the engaging and disengaging clutch. In the latter case a separate adjusting device is provided. Further a second operating means supply channel or space is provided which is assigned to the hydrodynamic clutch in the radial interior region or is coupled to a working chamber in the region of the radial interior diameter. By means of switching the functions of these two operating means supply channels or spaces as inlet and outlet channels the flow can be changed from centripetal to centrifugal and vice versa.

The volume of control pressure for realization of the movement of the mechanical built-in parts is selected or created depending on the arrangement of the adjusting device connection and to the mechanical built-parts, so that a movement of the mechanical built-in parts always takes place in the desired direction. In the development of the mechanical built-in parts as an annular slide valve this it is completely inserted in the deactivated state of the hydrodynamic clutch, i.e. the part forming the disturbance range is located in the working chamber in the position of the greatest possible theoretical influence. With the activation of the hydrodynamic clutch the annular slide valve is moved in the direction of lesser action, i.e. at least partially out of the working chamber or preferably completely out of it. The amount of control pressure for this purpose is preferably selected to be less than or equal to the pressure in the first operating means supply channel or space or a channel or space coupled thereto or to the interior of the housing. That is in the case of subjection the adjusting device to control pressure only the mechanical built-in parts would remain in their position. However a control pressure of random range is conceivable, even greater than the housing interior pressure or the pressure in the first operating means supply channel or space. This possibility is useful in particular in the case of embodiments with the development of the mechanical built-in parts in the form of sub-regions of a turbine wheel.

The adjusting devices assigned to the mechanical built-in parts can be of various designs. In the simplest case they are designed as a cylinder/piston unit, comprising at least one piston element guided in a cylinder, which with this forms at least two working chambers which can be subjected to pressure media at two front sides pointing away from one another—a first working chamber and a second working chamber. The first working chamber is connected to the first operating means supply channel or space, a channel or space connected thereto or the interior of the housing, while the second working chamber is coupled to a control pressure supply system. The piston is connected to the mechanical built-in parts at a front side turned away from the front side subjected to the control pressure. This means that the control pressure side is free from a coupling with the mechanical built-in parts. This ensures that no reduction by the control pressure side takes place in the interior housing space. Depending on the selection of the provision of control pressure the sensitive positioning of the mechanical built-in parts takes place by means of controlled reduction in an environment of lower pressure through clocked valve devices, for example connection of the control pressure side to the environment or direct subjection of the piston to a counter pressure.

There are various possibilities for the setting of the control pressure with regard to the design of the control pressure supply system. Said system comprises at least one control pressure source as well as a connection line, which with the adjusting device, in the case of the design as a cylinder-piston unit, is coupled to the second working chamber of said cylinder-piston unit. The term control pressure source is in this connection to be understood quite generally. By this both an aggregate or a system for the provision of an actively created counter pressure as well as also a space for reduction is understood. The corresponding control pressure can in the first named case be provided via a constant or controllable pressure media source or can be controlled via a valve device arranged in the clutch between the control pressure source and the adjusting device. Said valve device is preferably designed as a 2/1 directional control valve, which is clocked for control purposes. In accordance with an especially advantageous embodiment the control pressure supply system is a component of the operating means supply system. This means that the operating means source or the line system coupled to it can be used as the control pressure source and consequently also the inflation pressure is used as control pressure. This applies in analogy also for any existing valve devices.

In the simplest case however a pressure is used as the control pressure which is already present in the environment of the starting unit or the application area of said starting unit, in particular in the application in vehicles in pressures already present for the most varied functions of existing systems such as e.g. the pressure in the transmission or of another hydraulic or pneumatic system.

To realize a simple line routing the cylinder/piston unit of the adjusting device is developed in such a way that the connection of the piston unit to the mechanical built-in parts takes place at the front side pointing contrary to the required direction of movement. The connection to a front side pointing in the direction of movement is also conceivable. The created pressures are deciding. The cylinder-piston unit can for this purpose be arranged corresponding to one of the following named possibilities opposite the impeller pan coupled to the impeller or to the stationary housing:
a) at least partially outside of the impeller pan;
b) within the housing or the impeller pan, whereby the cylinder-piston unit is preferably flush with the impeller pan, but free from a theoretically possible only with additional sealing measures to suppress the connection between the second working chamber of the adjusting device and the first operating means supply channel or space;
c) arrangement at a random place in the Shousing or of the impeller pan with stationary or rotationally fixed coupling thereto and connection to the environment or connection possibility for the control pressure.

The mechanical built-in parts themselves can be active at any diameter between the inside diameter and the outside diameter of the working chamber. The effectiveness results from the extension into the working circuit developing in the working chamber. The disturbance ranges or centers of disturbance caused by the mechanical built-in parts are aligned at an angle to the flow circuit ensuing in the working circuit.

With regard to the development of the individual mechanical built-in parts there are no restrictions at all. They can be randomly designed. However, it is crucial that they are suitable for influencing the flow circuit in the working chamber. Preferably bolts or at least partially annular, i.e. also annular elements are used. The active surface characterizing the disturbance range extends over at least a sub-region of the working chamber in circumferential direction. The possibility exists to use only one element or a plurality of elements spaced apart from one another in circumferential direction, as this would be possible for example in the case of the provision of bolt elements. The concrete selection of the required measures depends on the desired changes of the moment of resistance for a desired volumetric efficiency. In principle the possibility exists to design mechanical built-in parts as separate elements to be introduced into the working chamber or to form them from the individual turbine wheels or components of said turbine wheels. In the latter case a sub-region of the walls guiding the flow at the working chamber are designed to be moved in axial direction. This is a matter of an annular wall region. In the case of a design with segments, for example subdivided segments in circumferential direction, a movability in radial direction would also be conceivable. The mechanical built-in parts can be assigned both to the primary turbine wheel as well as the secondary turbine wheel. It is only crucial that the desired influencing of the working circuit takes place in the direction of flow. The adjusting devices assigned to the mechanical built-in parts are preferably in accordance with an especially preferable embodiment with constructively simple implementation always supported or guided on the turbine wheel to which the mechanical built-in parts are assigned with regard to their action. In the case of assignment to the primary turbine wheel the support takes place on the pan coupled to the primary turbine wheel in a rotationally fixed manner. This means that the adjusting device always rotates at the same speed as the primary turbine wheel. Basically it applies that the mechanical built-in parts can be arranged and guided both on the primary turbine wheel as well as also on the secondary turbine wheel, whereby the arrangement of the adjusting device also takes place in correspondence to the choice of the conductance of the mechanical built-in parts and their design. In the process an effort should preferably always be made to have no slip prevailing between the elements at which the adjusting device is supported and the corresponding turbine wheel.

As already stated, the adjusting device is designed in the simplest case as a cylinder-piston unit with at least two working chambers. The cylinder or the working chambers holding the piston are formed by the wall of the housing or by the adjusting device of the engaging and disengaging clutch. The connecting line to the working chamber can be conducted in the wall of the housing via intermediate chambers, the wall or via a separate line at the adjusting device of the engaging and disengaging clutch. This applies in the same manner for the control pressure line.

The control pressure system for provision of the control pressure can be a pneumatic or hydraulic system. Preferably however hydraulic solutions are selected.

The design of the cylinder-piston unit with one piston and two working chambers constitutes an especially compact embodiment. The design of a plurality of individual cylinders connected in series and coupled to each other via the pistons is also conceivable, whereby in this case the cylinder-piston unit assigned to the control pressure system can be arranged preferably in axial direction directly at the primary turbine wheel, while the cylinder-piston unit assigned to the first operating means supply channel or space is arranged in axial direction at a distance to the unit assigned to the control pressure system.

In accordance with an improvement the control pressure is freely adjustable, as a result of which a particularly sensitive positioning of the mechanical built-in parts can be realized.

The inventive solution will be explained in the following with the help of figures. The figures show the following in detail:

FIG. 1 illustrates in schematically simplified representation the basic principle of the structure of a starting unit designed in accordance with the invention with mechanical built-in parts;

FIGS. 2a-2c illustrate various embodiments of the arrangement of the adjusting devices of mechanical built-in parts on the primary turbine wheel or the housing.

Figure 2A:
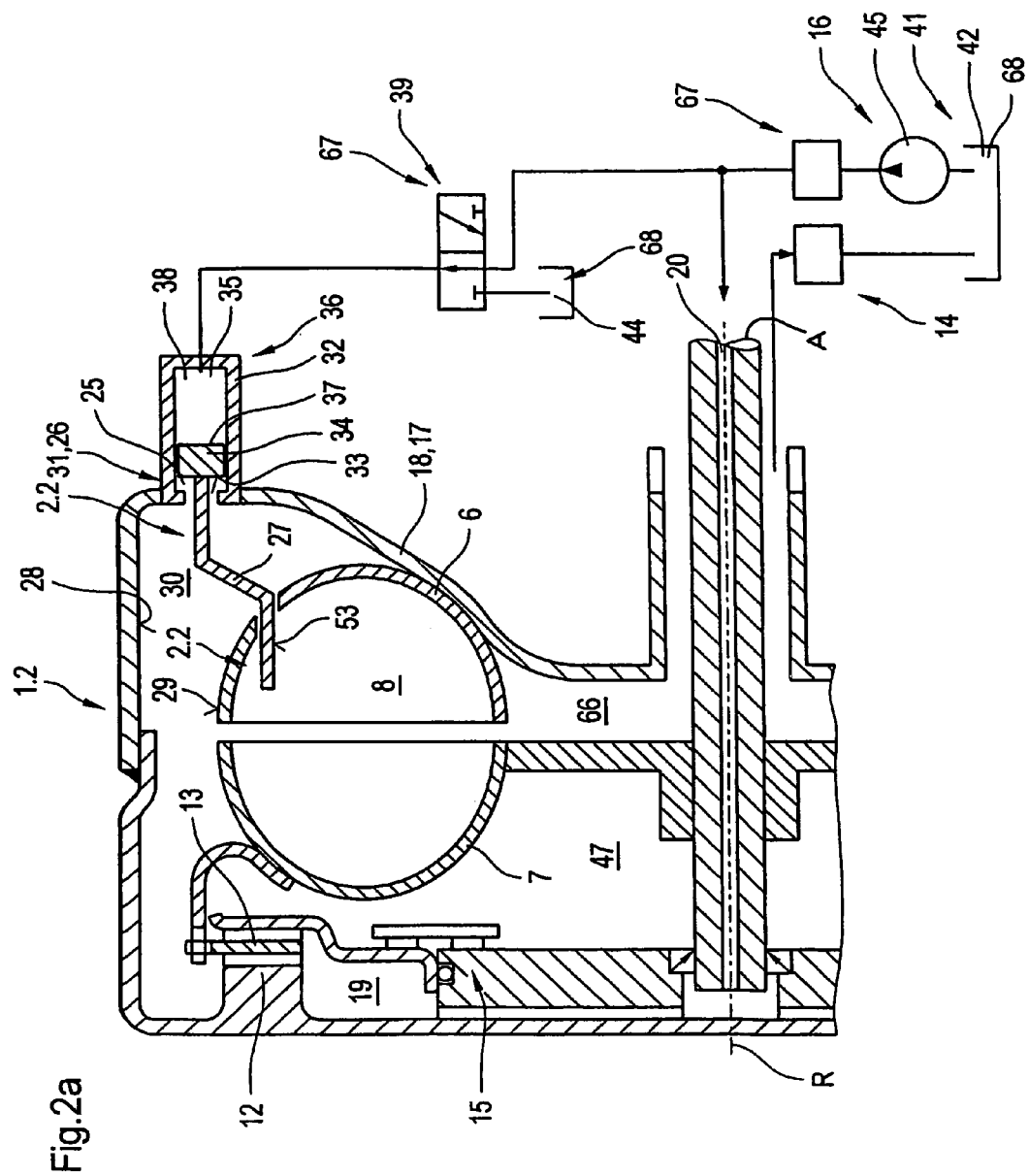

FIG. 1 illustrates in schematically simplified representation with the help of an axial section through a starting unit 1 the basic principle of the inventive means for influencing the transmission behavior 2 in the form of pressure-controlled mechanical built-in parts 3. The starting unit 1 comprises an input E that can be coupled to a drive and an output A that can be coupled to a driven part with subsequent transmission stages or to another type of driven part. The starting unit 1 further comprises a starting element 4. This is designed in the form of a hydrodynamic clutch 5 in the present case. The hydrodynamic clutch comprises two turbine wheels, also known as blade wheels, one impeller 6 in traction operation in the power transfer from the input E to the output A considered to be the pump wheel and a turbine wheel 7 acting as a turbine wheel, said wheels which together form a working chamber 8 that can be filled with operating material. The hydrodynamic clutch 5 is free from a stator and acts only as a speed converter between the input E and the output A, for which reason the impeller 6 is connected to the input and the turbine wheel 7 is connected to the output A or forms it. The starting unit 1 further comprises an engaging and disengaging clutch 9 arranged parallel to the starting element 4 in the form of the hydrodynamic clutch 5. The hydrodynamic clutch 5 and the engaging and disengaging clutch 9 can be engaged and disengaged either separately or jointly. The hydrodynamic clutch 5 and the engaging and disengaging clutch 9 are arranged in two different power branches, a first power branch 10 and a second power branch 11. The first power branch 10 makes the power transfer possible via the hydrodynamic clutch 5 and the second power branch 11 makes the power transfer possible via the engaging and disengaging clutch 9. The engaging and disengaging clutch 9 comprises at least two clutch elements that can be brought into active contact with each other, preferably in the form of clutch disks. These can be brought into frictionally engaged contact with each other either directly or at least indirectly via further intermediate elements. Considered in power flow direction from input E to output A, is a first clutch element, which can also be referred to as clutch input element 12 and coupled to it is a second clutch element, which can also be referred to as clutch output element 13 with output A, in particular via the turbine wheel 7.

The hydrodynamic clutch 5 is flowed through centripetally or centrifugally in the individual operating states of the starting unit. This flow direction also determines the power transfer direction via the first and/or second power branch.

For the purpose of power division an adjusting device is assigned to each transfer element—hydrodynamic clutch 5 and engaging and disengaging clutch 9—, said adjusting device guaranteeing the engagability. The portion of the transferable power by the hydrodynamic clutch 5 is determined by the position and with it the action of the mechanical built-in parts 3. For this purpose in accordance with FIG. 1 a valve device 40 is provided. Optionally, i.e. in addition this portion can also be influenced via the control and/or regulation of the volumetric efficiency FG of the hydrodynamic clutch 5. For this purpose the adjusting device 14 is provided, which along with the setting of the direction of flow can also bring about a setting of the volumetric efficiency. The engagability of the engaging and disengaging clutch 9 is guaranteed by the generation of a corresponding contact pressure between the clutch elements that can be brought into active contact with each other. A piston acts as the adjusting device 15, said piston which in turn can be activated indirectly via the adjusting device 14. The control of the power quantities that can be transferred via the first and/or second power branch 10 or 11 takes place consequently by control or variation of the contact force at the engaging and disengaging clutch 9 and the position of the mechanical built-in parts 3 which can be activated by pressure media as well as optionally via the control/regulation of the volumetric efficiency of the hydrodynamic clutch 5. With this embodiment at least three basic function states can be set. In the first basic function state only the hydrodynamic clutch 5 is engaged. In this state the power at input E is only transferred via the hydrodynamic clutch 5. The engaging and disengaging clutch 9 is deactivated. The transferable power is determined by the position of the built-in parts which can be activated by pressure media to the working chamber at a specified volumetric efficiency. Additionally however the possibility exists of influencing the transmission behavior of the hydrodynamic clutch 5 via the changing of the volumetric efficiency. In the process an increasing volumetric efficiency at constant speed causes a higher pressure in the working chamber 8 of the hydrodynamic clutch 5 and vice versa. In the second basic function state the engaging and disengaging clutch 9 is engaged. In this state the power at input E is only transferred via said engaging and disengaging clutch. The hydrodynamic clutch 5 is deactivated. This is realized via the changing of the contact pressure, so that the clutch is operated without slip. In the third basic function state both power branches 10 and 11 are activated. That is, a first power quantity is transferred via the hydrodynamic clutch 5 and a second power quantity is transferred via the engaging and disengaging clutch 9. Additionally under a further aspect the individual power quantities can also be controlled independently from each other. This third basic function state contains a short-term joint activation or activation via a main part of the starting range.

In the first basic function state, the so-called clutch or converter operation—depending on the design as hydrodynamic clutch 5 or converter—operating materials are supplied to the working chamber 8 via an operating means feed or supply system 16. The flow of starting unit 1 takes place in this case centripetally. The starting unit 1 comprises for this purpose a housing 17, which is designed as a stationary housing or, as represented in this figure, as a rotating housing in the form of an impeller pan 18 and which is connected to the impeller in a rotationally fixed manner. The impeller pan 18 surround the turbine wheel 7 in axial direction and in circumferential direction forming an adjacent chamber 47, which comprises a first operating means supply channel or space 19, which is bounded by the adjusting device 15 and the inside circumference 28 of the housing 17 or 18. Additionally a further second operating means supply channel or space 66 is provided, which flows in the region of the inside diameter $d_{18}$ of the working chamber 8 or below it. The first operating means supply channel or space 19 is used for the operation of the hydrodynamic element in the clutch or converter operation depending on the design as hydrodynamic clutch 5 or—not shown here—as a converter as operating means supply space, which is coupled via an operating means supply channel 20 to the operating means source 41, while the second operating means supply channel 66 or space acts as outlet channel 21 in this state. The engaging and disengaging clutch 9 is arranged in the first operating means supply channel or space 19 formed by the adjacent chamber 47, whereby said engaging and disengaging clutch is developed in such a way that in the first function state due to the operating material guided via the first operating means supply channel or space 19 it is suitable to be opened along on outside circumference 52 of the hydrodynamic component, in particular of the turbine wheel 7. The engaging and disengaging clutch 9 is kept in an opened state in this function state due to the pressure of the operating material in the first operating means supply channel or space 19, which is bounded by the inside circumference 28 of the impeller pan 18 and the adjusting device 15. By means of an optional change of the function of the individual operating means supply channels or spaces 19, 66 the direction of flow of the hydrodynamic component, in particular of the hydrodynamic clutch 5, can be changed in simple manner between centripetal and centrifugal.

The supply to the first operating means supply channel or space 19 takes place for example via an output shaft 24 of the starting unit 1 constructed as a hollow shaft 23. In accordance with the invention means 2 for the influencing of the transmission behavior, in particular for influencing the flow circuit of the working circuit ensuing in the working chamber 8, are assigned to the working circuit, which are constructed as pressure controlled mechanical built-in parts 3. In accordance with the invention these means are subjected to pressure via the operating material branched off from the operating means supply channel or space 19 or the operating means supply channel 20 directly coupled thereto. The subjection to pressure does not take place directly, but rather under the development of a differential pressure from the pressure in the first operating means supply channel or space 19 or a channel or space coupled thereto or the pressure in the interior 47 of the housing in the region of the adjusting device 26 and a control pressure. For this purpose a control pressure supply system 67 is supplied, comprising a control pressure medium source 68, which is coupled to an adjusting device 26 for the pressure-controlled mechanical built-in parts 3. The pressure-controlled mechanical built-in parts 3 can be designed differently. However, common to all different designs is the fact that they cause a diversion of the flow circuit of the working circuit ensuing in the working chamber 8. For this purpose they are designed as elements that can be arranged at an angle to the flow circuit in the working chamber 8 or as guidance elements designed parallel to the flow circuit, for example in the form of walls of the turbine wheels which in their location can be moved in axial direction and/or with designs of a turbine wheel with divided segments in circumferential direction in radial direction. Examples for the concrete design are described in the following figures.

The embodiment shown in FIG. 1 of the adjusting device 26 is characterized by a cylinder-piston unit 36, comprising a cylinder 32, in which a piston 34 coupled to the mechanical built-in parts 3 is guided. The cylinder-piston unit 36 comprises two working chambers, a first working chamber 25, in which a front side 33 of the piston 34 is subjected to pressure by the pressure media from an intermediate chamber 30 between the inside circumference 28 of the impeller pan 18 and the impeller 6, which is coupled to the chamber 19, and an additional working chamber 35, which impinges the piston 34 on a front side 37 turned away from the first working chamber 25. Further a spring device 38 is provided which brings the piston 34 to a predefined starting position and with this also to the mechanical built-in units 3 coupled thereto. The second working chamber 35 is additionally coupled to the control pressure media supply system 67. This system can for example be formed by a space in the environment of the starting unit such as the transmission. A valve device 40 is provided for setting the differential pressure, said valve device which can be clocked. In the described case, the mechanical built-in units 3 are connected to the working piston 34 in respect of the direction of its movement. In the process the movement takes place in such a way that in the starting range, i.e. range of high slip (low torque transmission) the influence is given by the mechanical built-in units and in the region of low slip this influence is reduced or completely eliminated. The placement of the mechanical built-in units is therefore set as a function of the pressures, in particular on the individual built-in unit. In the starting region of the hydrodynamic clutch the wall region 43 is completely moved and is moved during the power transfer via the hydrodynamic clutch back in the region of low slip (high torque transmission), so that it again assumes the guiding function for the flow circuit.

The cylinder-piston unit 36 is arranged at least partially outside of the housing 17. In the represented case said unit is flush with said housing. As a result no additional sealing measures are necessary for the second working chamber or the second working chamber 35 opposite the interior 30 or the operating means supply channel or space 19. It is crucial that the control pressure becomes active contrary to the direction of movement at the adjusting device 26, while the pressure in the operating means supply channel or space 19 or a space coupled thereto, here 30 as sub-region of the adjacent chamber 47 formed by the impeller pan 18, becomes active in the required direction of movement of the mechanical built-in parts 3. In the represented case these are designed as elements guiding the working circuit in the form of an annular wall region 43 on the primary turbine wheel 6.

Figure 2B:
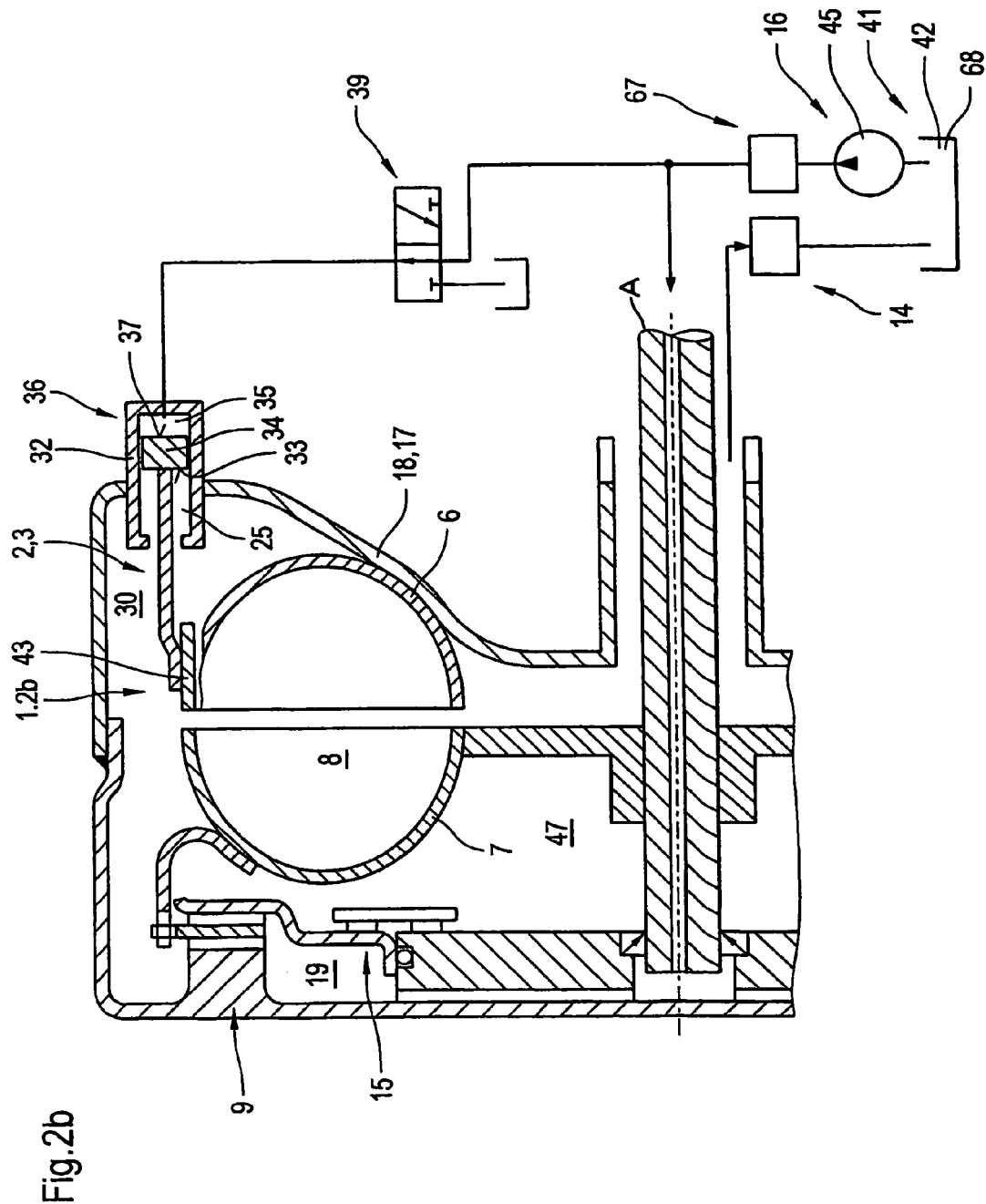

FIG. 2a illustrates a first embodiment option of a starting unit 1.2 with means 2.2 for influencing the transmission behavior in the form of so-called annular slide valves 27, which become active in the working chamber 8. Said annular slide valves are partially annular elements which extend in axial direction at least partially through a turbine wheel whereby the surface of said slide valves characterizing the inside circumference is aligned at an angle to the flow circuit in the working chamber 8, preferably near vertical. The annular slide valve 27 is assigned to the primary turbine wheel 6 here. Said slide valve is guided on the primary turbine wheel 6 and can be moved opposite said primary turbine wheel in axial direction, i.e. parallel to the rotational axis R. The movement consequently takes place contrary to the embodiment in FIG. 1 in the range of very high slip (low torque transmission) into the working chamber 8 and in the non-influencing state (high torque transmission) into the intermediate space 30 formed between the inside circumference 28 of the housing 17 or the impeller pan 18 and the outside circumference 29 of the impeller 6.2, whereby then either no influence or only a slight influence of the flow circuit is given in the working chamber 8. An adjusting device 31 is assigned to the annular slide valve 27. Said adjusting device is the adjusting device 26 in accordance with FIG. 1. This is preferably supported on the housing 17, in the represented case of the impeller pan 18, and coupled to the annular slide valve 27. The adjusting device 31 comprises a cylinder-piston unit 36 which can be activated by pressure media, comprising a cylinder 32, whose working piston 34 is connected to the annular slide valve 27. The front side 33 coupled to the annular slide valve 27 can be subjected to the action of pressure by pressure media from the interior 30, which is coupled to operating means supply channel or space 19. The other front side of the piston 34 can be subjected to the action of pressure by the control pressure from the control pressure media source 67. The cylinder 32 can in the process be formed by the housing 17 or the impeller pan 18 or an element that is connected thereto in a stationary or rotationally fixed manner. The working piston 34 is then guided in this cylinder. The coupling of the first working chamber 25 to the operating means supply channel or space 19 or the operating means supply channel 20 takes place via the intermediate space 30 connected thereto. The connection of the operating means supply channel or space 19 to the operating means supply line 20 takes place for example via a line integrated into the housing and/or a channel and/or space. Preferably the formation of the channels takes place by integration in wall regions on the impeller pan 18, separate pipelines are also conceivable. The arrangement of the adjusting device occurs preferable in a region which lies in axial direction in the direction of movement of the annular slide valve 27. In the embodiment represented in FIG. 2a the arrange takes place in the process outside of the impeller pan 18. Extensions into the intermediate space 30 are also conceivable and are represented in FIG. 2b. Further it is conceivable to completely integrate this cylinder-piston unit 36 in the housing 17 in accordance with FIG. 2c, whereby also here attention is paid to the connection to the piston 34, so that the coupling to the mechanical built-in parts preferably always lies at the front side pointing contrary to the movement of direction between the desired position in the case of high slip and low slip and consequently the subjection to the action of pressure from the operating means supply chamber or space 19 always takes place in the direction of movement from the neutral position, i.e. a position in the non-influencing state to the influencing state. The connection of the mechanical built-in parts 3 to the piston 34 in the direction of movement is also conceivable. However, in this case the pressures are to be selected correspondingly.

If the embodiment represented in FIG. 2a illustrates mechanical built-in parts 3 in the form of an annular slide valve 27, FIGS. 1 and 2b through 2c show an alternative embodiment with the formation of these by wall regions 43 on one of the turbine wheels, preferably on the impeller 6. This wall region 43 is preferably annular in design, partially annular embodiments in the case of rotationally fixed connection of the adjusting device 26 or 31 to an element that is coupled in a rotationally fixed manner to the impeller 76 are also conceivable. The wall region 43 serves the purpose of conducting the operating material in the working circuit in the working chamber 8.

In the embodiments described in FIGS. 1 and 2c a spring unit 38 is additionally provided in the second working chamber 35, said spring unit being supported on the inside wall of the cylinder 32 and on a front side 37 of the piston 34 that is turned away from the connection of the mechanical built-in parts 3 to the piston 34. This spring unit is preferably designed in such a way that the initial stressing force applied by it is sufficient to hold the piston 34 securely in a starting position. The starting position or the piston 34 is characterized by the fact that the mechanical built-in parts 3 exert no influence on the flow in the working circuit or the wall regions 43 conduct the flow to the turbine wheels.

Additionally FIGS. 2a and 2b illustrate in advantageous embodiment one possibility of joint usage of components by the operating means supply system 16 and the control pressure supply system 67. Both systems are coupled to each other and use a joint operating means or pressure media source. In the process the connection to the channel functioning as an operating means supply line in the case of centripetal flow or functioning as channel 20 takes place. The control of the control pressure takes place then via valve devices, here valve device 39, which can be designed as a 3/1 directional control valve and is preferably controllable. The control pressure media source 68 or the operating means source 41 of the operating means conduction and supply system 16 is for example constructed as tank 42. This applies in analogy also for the embodiments in accordance with FIGS. 1 and 2c with separate operating means and control pressure media sources 41 and 68. Then the control pressure media source is constructed for example as a housing 44 of the transmission forming chamber. Corresponding conveying devices for guaranteeing the operating means and control pressure media flow or circulation are further integrated into the individual operating means supply and the control pressure supply systems 16 and 67. For the operating means supply and conduction system 16 said conveying devices are marked 45.

Depending on the volume of the overall control pressure resulting from the pressures present in working chambers 35 and 25, which correspond to the control pressure and the pressure in the operating means supply channel or space 19 or to the pressure present in the intermediate space 30 coupled thereto, the active pressure on the piston 34 develops. This is for example converted into a regulating distance S for the axial movement of the annular slide valve 27 or of the wall regions 43. In order to have no hindrance of the annular slide valve 27 or the wall regions 43 in the non-influenced state and to have a fixed assignment to the respective turbine wheel upon activation, the annular slide valve 27 or the wall regions 43 and the adjusting devices 26, 31 associated thereto should rotate at the same speed as the turbine wheel on which they become active. For this reason the coupling in the case of assignment to the impeller 6 takes place with priority over the impeller pan 18 coupled to it in a rotationally fixed manner. The conductance of the pressure medium in the form of operating materials branched off from operating means supply channel can, as shown in FIGS. 1 and 2, take place between the impeller pan 18 and the adjusting device 15 of the engaging and disengaging clutch 9 around the secondary turbine wheel 7.

If in accordance with FIG. 2a an annular slide valve 27 and in accordance with FIGS. 1 and 2b, 2c a wall region 43 acts on the working circuit in the working chamber 8, embodiments with bolt elements are also conceivable. Also conceivable are embodiments not shown here with action of the mechanical built-in parts 3 on the turbine wheel.

LIST OF REFERENCE SYMBOLS 1, 1.2, 1.2b, 1.2c Starting unit
2 Means for influencing the transmission behavior
3 Pressure media controlled mechanical built-in parts
4 Starting element
5 Hydrodynamic clutch
6 Primary turbine wheel
7 Secondary turbine wheel
8 Working chamber
9 Engaging and disengaging clutch
10 First power branch
11 Second power branch
12 Clutch input element
13 Clutch output element
14 Adjusting device
15 Adjusting device
16 Operating means conductance and/or supply system
17 Housing
18 Impeller
19 First operating means supply channel or space
20 Operating means supply channel
21 Outlet channel
22 Radial exterior region
23 Hollow shaft
24 Output shaft
25 First working chamber
27 Annular slide valve
28 Inside circumference
29 Outside circumference
30 Intermediate space
31 Adjusting device
32 Cylinder
33 Front side of the piston coupled to the annular slide valve
34 Working piston
35 Second working chamber
36 Cylinder-piston unit 37 Front side
38 Spring device
39 Valve device
40 Valve device
41 Operating means source
42 Tank
43 Wall region
44 Housing
45 Pump device
46 Adjacent chamber
47 Interior
52 Outside circumference
53 Inside circumference
66 Second operating means supply channel or space
68 Control pressure source

The invention claimed is:

1. A starting unit comprising:
an input which can be coupled to a drive and an output that can be coupled to a driven part;
a starting element in the form of a hydrodynamic component, comprising at least one primary blade wheel and one secondary blade wheel which, together, form a working chamber which can be filled with operating material;
an engaging and disengaging clutch, comprising at least two clutch elements that can be brought into frictionally engaged contact with one another in a direct or indirect manner via additional intermediate elements, the first clutch element being at least indirectly connected to the input in a rotationally fixed manner and the second clutch element being at least indirectly connected to the output in a rotationally fixed manner, and a first adjusting device assigned thereto;
a stationary or rotating housing that surrounds at least one of the blade wheels while forming an adjoining chamber;
the first adjusting device of the engaging and disengaging clutch being situated in the adjoining chamber while forming a first operating means material supply channel or space and can be subjected to the action of pressure prevailing therein;
the operating means material supply channel or space adapted to be connected at least indirectly to an operating means supply source;
means for influencing the transmission behavior of the hydrodynamic component, comprising at least one mechanical built-in part supported on and rotatable with one of the blade wheels in the form of at least one separate element that can be introduced into the working chamber or of at least one element forming a sub-region of the wall of one of the blade wheels, that acts at least indirectly upon the working circuit ensuing inside the working chamber, the means for influencing reducing torque transmission by at least one of introducing the separate element into the working chamber to disturb the flow of the operating material or removing the element forming a sub-region of the wall to disturb the flow of the operating material; and
a second adjusting device assigned to the mechanical built-in part and means for subjecting the second adjusting device to a differential pressure, which results from the pressure in the first operating means supply channel or space or in a channel or space coupled thereto or in the interior of the housing and to a control pressure.

2. The starting unit according to claim 1, wherein:
the second adjusting device of the mechanical built-in part comprises at least one cylinder-piston unit, comprising at least one piston element guided in a cylinder, which with this forms at least two working chambers which can be subjected to pressure media at two front sides pointing away from one another—a first working chamber and a second working chamber;
the first working chamber is at least indirectly connected to the first operating means supply channel or space or to the operating means supply source, while the second working chamber is coupled to a control pressure supply system;
the piston is connected to the mechanical built-in part at a front side turned away from the front side subjected to the control pressure.

3. The starting unit according to claim 2, wherein the piston at the front side coupled to the mechanical built-in part is subjected to pressure by the operating material from the first operating means supply channel or space or by a channel or space coupled thereto.

4. The starting unit according to claim 3, wherein the control pressure supply system comprises at least a constant or controllable pressure media source, which is coupled via at least one valve device to the second adjusting device.

5. The starting unit according to claim 2, wherein the control pressure supply system comprises at least a constant or controllable pressure media source, which is coupled via at least one valve device to the second adjusting device.

6. The starting unit according to claim 5, wherein the coupling to the pressure media source is conducted through the wall of the housing or an element coupled to an individual said blade wheel in a rotationally fixed manner.

7. The starting unit according to claim 2, including a control pressure supply system that contains components of the operating means supply source and a conductance system.

8. The starting unit according to claim 7, wherein a control pressure media source supply system is formed by the operating means supply source.

9. The starting unit according to claim 2, wherein the control pressure media supply system is formed by a hydraulic or pneumatic system arranged in the environment of the starting unit.

10. The starting unit according to claim 9, wherein a control pressure media source is formed by a space in which the control pressure media is relieved thus relieving the adjusting device.

11. The starting unit according to claim 2, wherein the pressure media-activated mechanical built-in parts are carried either on the housing and/or on one of said blade wheels.

12. The starting unit according to claim 1, wherein the mechanical built-in part is carried on the housing and/or on one of said blade wheels.

13. The starting unit according to claim 1, wherein the first and second adjusting devices are supported on the housing, wherein the housing is either stationary or coupled to the primary blade wheel in a rotationally fixed manner.

14. The starting unit according to claim 1, wherein pressure medium is conducted from the operating means supply channel and/or space via a connection line connected at least indirectly to at least one of the adjusting devices.

15. The starting unit according to claim 14, wherein the connection line is carried in the housing.

16. The starting unit according to claim 1, wherein the pressure-media activated mechanical built-in part comprises an annular slide valve which can be moved in an axial direction and which is formed by an element extending in circumferential direction and is at least partially annular.

17. The starting unit according to claim 1, wherein the pressure-media activated mechanical built-in part is formed by a bolt-shaped element that can be moved in an axial direction.

18. The starting unit according to claim 1, wherein the mechanical built-in part is formed by a sub-region of the wall of a said one blade wheel, which is used to conduct the flow circuit.

19. The starting unit according to claim 1, wherein the pressure-media activated mechanical built-in part is assigned to the primary blade wheel.

20. The starting unit according to claim 1, wherein the pressure-media activated mechanical built-in parts are assigned to the secondary blade wheel.

21. A starting unit comprising:
   an input which can be coupled to a drive and an output that can be coupled to a driven part;
   a starting element in the form of a hydrodynamic component, comprising at least one primary blade wheel and one secondary blade wheel which, together, form a working chamber which can be filled with operating material;
   an engaging and disengaging clutch, comprising at least two clutch elements that can be brought into frictionally engaged contact with one another in a direct or indirect manner via additional intermediate elements, the first clutch element being at least indirectly connected to the input in a rotationally fixed manner and the second clutch element being at least indirectly connected to the output in a rotationally fixed manner, and a first adjusting device assigned thereto;
   a stationary or rotating housing that surrounds at least one of the blade wheels while forming an adjoining chamber;
   the first adjusting device of the engaging and disengaging clutch being situated in the adjoining chamber while forming a first operating means material supply channel or space and can be subjected to the action of pressure prevailing therein;
   the operating means material supply channel or space adapted to be connected at least indirectly to an operating means supply source;
     means for influencing the transmission behavior of the hydrodynamic component, comprising at least one mechanical built-in part supported on and rotatable with one of the blade wheels in the form of at least one separate element that can be introduced into the working chamber or of at least one element forming a sub-region of the wall of one of the blade wheels, that acts at least indirectly upon the working circuit ensuing inside the working chamber;
   a second adjusting device assigned to the mechanical built-in part and means for subjecting the second adjusting device to a differential pressure, which results from the pressure in the first operating means supply channel or space or in a channel or space coupled thereto or in the interior of the housing and to a control pressure; and
   wherein said second adjusting device is controllable independently of said first adjusting device.

22. A starting unit comprising:
   an input which can be coupled to a drive and an output that can be coupled to a driven part;
   a starting element in the form of a hydrodynamic component, comprising at least one primary blade wheel and one secondary blade wheel which, together, form a working chamber which can be filled with operating material;
   an engaging and disengaging clutch, comprising at least two clutch elements that can be brought into frictionally engaged contact with one another in a direct or indirect manner via additional intermediate elements, the first clutch element being at least indirectly connected to the input in a rotationally fixed manner and the second clutch element being at least indirectly connected to the output in a rotationally fixed manner, and a first adjusting device assigned thereto;
   a stationary or rotating housing that surrounds at least one of the blade wheels while forming an adjoining chamber;
   the first adjusting device of the engaging and disengaging clutch being situated in the adjoining chamber while forming a first operating means material supply channel or space and can be subjected to the action of pressure prevailing therein;
   the operating means material supply channel or space adapted to be connected at least indirectly to an operating means supply source;
     means for influencing the transmission behavior of the hydrodynamic component, comprising at least one mechanical built-in part supported on and rotatable with one of the blade wheels in the form of at least one separate element that can be introduced into the working chamber or of at least one element forming a sub-region of the wall of one of the blade wheels, that acts at least indirectly upon the working circuit ensuing inside the working chamber;
   a second adjusting device assigned to the mechanical built-in part and means for subjecting the second adjusting device to a differential pressure, which results from the pressure in the first operating means supply channel or space or in a channel or space coupled thereto or in the interior of the housing and to a control pressure;
   the second adjusting device of the mechanical built-in part comprises at least one cylinder-piston unit, comprising at least one piston element guided in a cylinder, which with this forms at least two working chambers which can be subjected to pressure media at two front sides pointing away from one another—a first working chamber and a second working chamber;
   the first working chamber is at least indirectly connected to the first operating means supply channel or space or to the operating means supply source, while the second working chamber is coupled to a control pressure supply system;
   the piston is connected to the mechanical built-in part at a front side turned away from the front side subjected to the control pressure; and
   wherein said second adjusting device is controllable independently of said first adjusting device.

23. A starting unit comprising:
   an input which can be coupled to a drive and an output that can be coupled to a driven part;
   a starting element in the form of a hydrodynamic component, comprising at least one primary blade wheel and one secondary blade wheel which, together, form a working chamber which can be filled with operating material;
   an engaging and disengaging clutch, comprising at least two clutch elements that can be brought into frictionally engaged contact with one another in a direct or indirect manner via additional intermediate elements, the first clutch element being at least indirectly connected to the input in a rotationally fixed manner and the second clutch element being at least indirectly connected to the output in a rotationally fixed manner, and a first adjusting device assigned thereto;

a stationary or rotating housing that surrounds at least one of the blade wheels while forming an adjoining chamber;

the first adjusting device of the engaging and disengaging clutch being situated in the adjoining chamber while forming a first operating means material supply channel or space and can be subjected to the action of pressure prevailing therein;

the operating means material supply channel or space adapted to be connected at least indirectly to an operating means supply source;

means for influencing the transmission behavior of the hydrodynamic component, comprising at least one mechanical built-in part supported on and rotatable with one of the blade wheels in the form of at least one separate element that can be introduced into the working chamber or of at least one element forming a sub-region of the wall of one of the blade wheels, that acts at least indirectly upon the working circuit ensuing inside the working chamber;

a second adjusting device assigned to the mechanical built-in part and means for subjecting the second adjusting device to a differential pressure, which results from the pressure in the first operating means supply channel or space or in a channel or space coupled thereto or in the interior of the housing and to a control pressure;

the mechanical built-in part is formed by a sub-region of the wall of a said one blade wheel, which is used to conduct the flow circuit; and wherein said second adjusting device is controllable independently of said first adjusting device.

* * * * *